(12) United States Patent
Bloxham et al.

(10) Patent No.: US 10,844,944 B2
(45) Date of Patent: Nov. 24, 2020

(54) INVERTED HARMONIC GEAR ACTUATOR

(71) Applicant: Hamilton Sundstrand Corporation, Charlotte, NC (US)

(72) Inventors: Keith Bloxham, Gilbert, AZ (US); Derick S. Balsiger, Mayer, AZ (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 207 days.

(21) Appl. No.: 15/686,375

(22) Filed: Aug. 25, 2017

(65) Prior Publication Data

US 2019/0063578 A1 Feb. 28, 2019

(51) Int. Cl.
*F16H 49/00* (2006.01)
*H02K 7/11* (2006.01)
*H02K 7/116* (2006.01)

(52) U.S. Cl.
CPC .......... *F16H 49/001* (2013.01); *H02K 7/116* (2013.01); *F16H 2049/003* (2013.01)

(58) Field of Classification Search
CPC .. H02K 7/00; H02K 7/06; H02K 7/10; H02K 7/106; H02K 7/11; H02K 7/116; H02K 7/20; H02K 41/00; H02K 41/06; F16H 49/00; F16H 49/001; F16H 37/04; F16H 37/041; F16H 57/00; F16H 57/02; F16H 57/021; F16H 61/00; F16H 61/28; F16H 61/32; F16D 63/00; F16D 63/006; F16D 63/08; F16D 63/18; F16D 65/18; B25J 9/10; B25J 9/102; B25J 9/1025; B25J 9/12; B25J 19/00; B25J 19/0004; B25J 19/10
See application file for complete search history.

(56) References Cited

U.S. PATENT DOCUMENTS

| | | | |
|---|---|---|---|
| 2,906,143 A | | 9/1959 | Musser |
| 4,398,110 A | * | 8/1983 | Flinchbaugh .......... B25J 9/1025 310/83 |
| 6,155,220 A | * | 12/2000 | Marriott .................... F01L 1/34 123/90.17 |

(Continued)

FOREIGN PATENT DOCUMENTS

| | | |
|---|---|---|
| CN | 106230186 | 12/2016 |
| EP | 1764530 A1 | 3/2007 |
| WO | 8900651 | 1/1989 |

OTHER PUBLICATIONS

EP Application No. 18179664.0 Extended European Search Report dated Oct. 19, 2018, 9 pages.

(Continued)

*Primary Examiner* — Tran N Nguyen
(74) *Attorney, Agent, or Firm* — Cantor Colburn LLP

(57) ABSTRACT

An inverted harmonic gear actuator is provided and includes a motor stator and a motor rotor radially disposed within the motor stator. The inverted harmonic gear actuator also includes a wave generator radially disposed within the motor rotor, where the wave generator has a radially inner surface with a cammed shape. An actuator output shaft is radially disposed within the wave generator. A flex spline is radially interposable between the radially inner surface of the wave generator and the actuator output shaft. The flex spline is deformable to conform to the radially inner surface of the wave generator and drive rotation of the actuator output shaft slower than rotation of the motor rotor.

14 Claims, 4 Drawing Sheets

(56) References Cited

U.S. PATENT DOCUMENTS

| | | | |
|---|---|---|---|
| 6,566,777 B2 | 5/2003 | AbuAkeel | |
| 6,701,803 B1* | 3/2004 | Tamai | F16H 49/001 |
| | | | 74/640 |
| 7,178,427 B2 | 2/2007 | Christensen | |
| 7,421,990 B2* | 9/2008 | Taye | F01L 1/344 |
| | | | 123/90.15 |
| 7,453,176 B2 | 11/2008 | Davison | |
| 7,524,261 B1* | 4/2009 | Osborn | F16H 1/28 |
| | | | 475/331 |
| 7,777,385 B2 | 8/2010 | Wingett et al. | |
| 8,146,886 B2 | 4/2012 | Hanlon et al. | |
| 8,191,821 B2 | 6/2012 | Knight | |
| 9,157,517 B2 | 10/2015 | Lunin et al. | |
| 2012/0085188 A1 | 4/2012 | Kurogi | |
| 2014/0232159 A1* | 8/2014 | Villarroel | F16H 49/001 |
| | | | 297/362 |

OTHER PUBLICATIONS

EP Application No. 18179664.0 Office Action dated Jan. 13, 2020, 7 pages.

\* cited by examiner

500

510 — Couple a wave generator radially within a motor rotor, the wave generator including a radially inner surface with a cammed shape

520 — Interpose a flex spline radially between the radially inner surface of the wave generator and an actuator output shaft, the flex spline deformed to conform to the radially inner surface of the wave generator and drive rotation of the actuator output shaft slower than rotation of the motor rotor

530 — Position the motor rotor radially within a motor stator

FIG. 6

INVERTED HARMONIC GEAR ACTUATOR

STATEMENT OF FEDERAL SUPPORT

This invention was made with government support under D6305-ADPC-30-F4-1000000 awarded by the United States Navy. The government has certain rights in the invention.

BACKGROUND

This disclosure relates to an actuation system and, more specifically, to an actuator with an inverted harmonic gear.

Actuation devices that use electric motors typically require additional gearing, such as a gearbox, to reduce the output speed and increase the output torque. The gearing is typically attached to the end of the motor resulting in a longer actuation unit that extends beyond an output shaft of the motor. Conventionally, a rotary actuator uses an epicyclic-type reduction gear drive, commonly referred to as a planetary gear drive, to step down high speed rotation input by an electric drive motor. It is also common for a rotary actuator to use a planetary gear drive with multiple stages (multiple sets of planet gears) to increase the reduction ratio and decrease the size and weight of the motor, increasing the torque-to-weight ratio of the actuator. While incorporating multiple stages into the planetary gear drive increases the reduction ratio, it also undesirably increases the size, weight, and complexity.

BRIEF SUMMARY

According to one aspect of the disclosure, an inverted harmonic gear actuator is provided. The inverted harmonic gear actuator includes a motor stator and a motor rotor radially disposed within the motor stator. The inverted harmonic gear actuator also includes a wave generator radially disposed within the motor rotor, where the wave generator has a radially inner surface with a cammed shape. An actuator output shaft is radially disposed within the wave generator. A flex spline is radially interposable between the radially inner surface of the wave generator and the actuator output shaft. The flex spline is deformable to conform to the radially inner surface of the wave generator and drives the rotation of the actuator output shaft slower than rotation of the motor rotor.

In addition to one or more of the features described above, a radially inner surface of the flex spline includes a first plurality of gear teeth operable to mesh with a second plurality of gear teeth of a gear interface of the actuator output shaft.

In addition to one or more of the features described above, the radially inner surface of the flex spline includes a greater number of gear teeth than a number of gear teeth on the gear interface of the actuator output shaft.

In addition to one or more of the features described above, the motor rotor and the gear interface of the actuator output shaft are substantially circular.

In addition to one or more of the features described above, or as an alternative to any of the foregoing embodiments, further embodiments may include where the actuator output shaft extends axially outward from the motor rotor and includes a splined interface to drive rotation of a load.

In addition to one or more of the features described above, or as an alternative to any of the foregoing embodiments, further embodiments may include a plurality of roller bearings radially disposed between the radially inner surface of the wave generator and a radially outer surface of the flex spline.

In addition to one or more of the features described above, or as an alternative to any of the foregoing embodiments, further embodiments may include a roller bearing inner race disposed between the flex spline and the roller bearings, and a roller bearing outer race disposed between the wave generator and the roller bearings.

In addition to one or more of the features described above, or as an alternative to any of the foregoing embodiments, further embodiments may include a plurality of windings coupled to the motor stator and a plurality of magnets coupled to the motor rotor.

In addition to one or more of the features described above, or as an alternative to any of the foregoing embodiments, further embodiments may include where the wave generator and the motor rotor are integrated in a single piece.

In accordance with additional or alternative embodiments, a method of assembling an inverted harmonic gear actuator is provided. The method includes coupling a wave generator radially within a motor rotor. The wave generator includes a radially inner surface with a cammed shape. A flex spline is radially interposed between the radially inner surface of the wave generator and an actuator output shaft. The flex spline is deformable to conform to the radially inner surface of the wave generator and drives the rotation of the actuator output shaft slower than rotation of the motor rotor. The motor rotor is radially positioned within a motor stator.

A technical effect of embodiments is achieved incorporating an inverted harmonic gear within an electric motor. The inverted harmonic gear can reduce an output speed of an output shaft of the motor from within the motor to eliminate or reduce external gearing and provide increased torque in a compact package. A resulting increase in motor diameter can enlarge cooling surface area and ease motor cooling requirements by arranging hotter components, such as motor windings, radially outward of the actuator.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 6 is a process of assembling an inverted harmonic gear actuator in accordance with embodiments.

DETAILED DESCRIPTION

As will be described below, an inverted harmonic gear actuator is provided. A harmonic drive can reduce backlash in a motion-control system. A harmonic gear of a harmonic drive allows high reduction ratios with concentric shafts and low backlash and high torque to weight ratio compared to a single stage or multi-stage planetary gear drive. The structure and operation of a harmonic gear are based upon construction using elasto-mechanical properties of metal. A harmonic gear typically includes a wave generator, a flexible (flex) spline and a ring gear, where the wave generator is typically an oval or elliptical cam with a thin bearing placed around an outer circumference thereof and is mounted onto a shaft of a motor. In contrast to a harmonic drive, an inverted harmonic gear actuator includes a wave generator radially inward of a motor rotor, where a cammed shape of a radially inner surface of the wave generator drives rotation of a flex spline that conforms to the cammed shape and further drives rotation of a radially inward actuator output shaft having a substantially circular shape according to embodiments. The motor rotor, a motor stator, the wave generator, the flex spline, and the actuator output shaft are coaxially aligned with respect to each other. Incorporating an inverted harmonic gear within the internal volume of an electric motor can provide an actuator with a similar or improved reduction ratio as an external planetary gear system and result in a lower weight and reduced size package.

Figure 1:
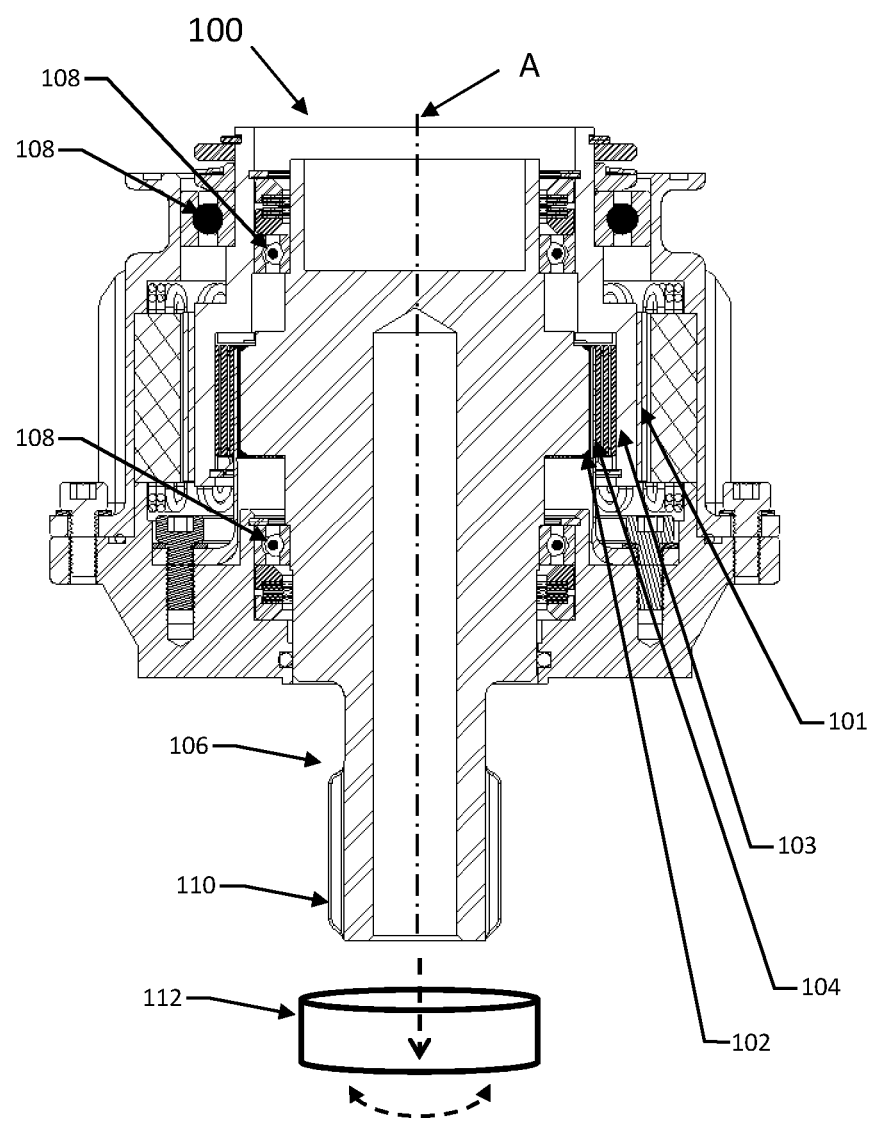
FIG. 1 is a sectional view of an inverted harmonic gear actuator in accordance with embodiments.
Figure 2:
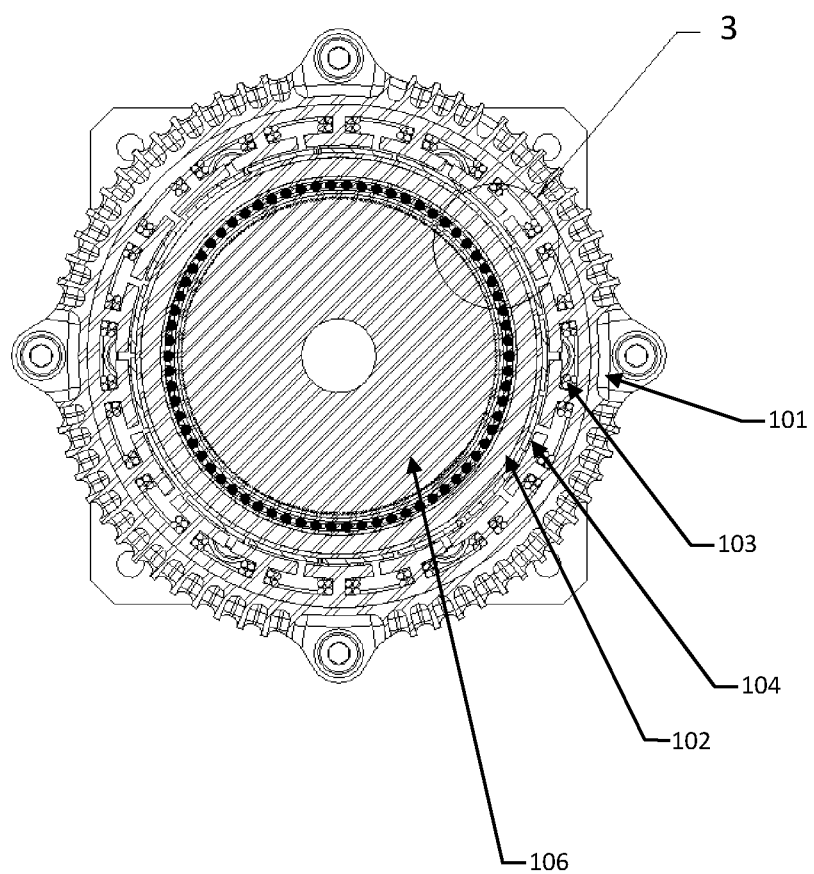
FIG. 2 is another sectional view of the inverted harmonic gear actuator of FIG. 1 in accordance with embodiments.
Figure 3:
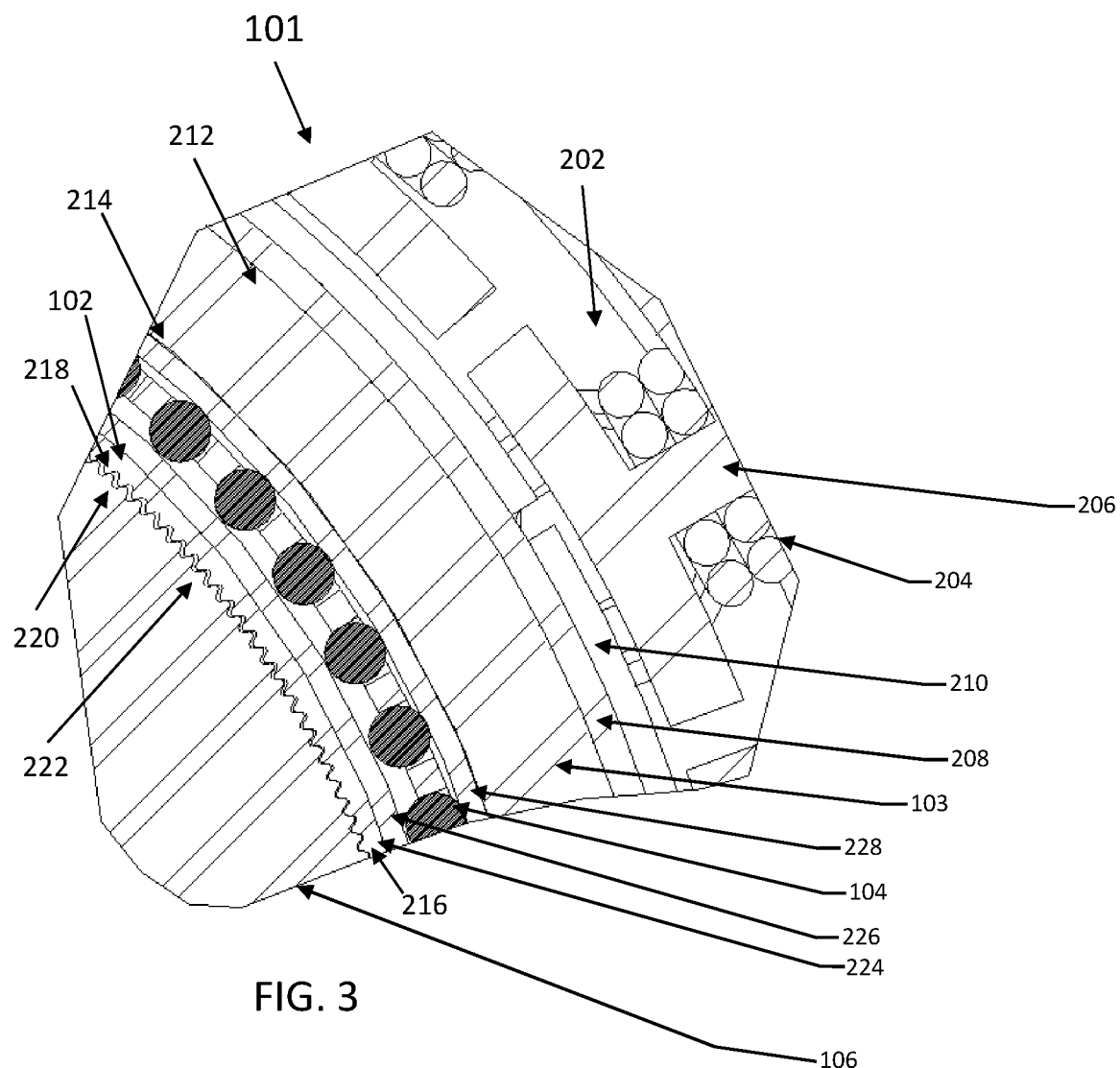
FIG. 3 is an enlarged view of a portion of the inverted harmonic gear actuator of FIG. 2 in accordance with embodiments.
Figure 4:
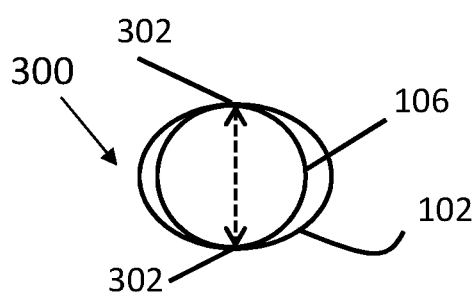
FIG. 4 is a schematic view of an interaction between an actuator output shaft and a flex spline in accordance with embodiments.
Figure 5:
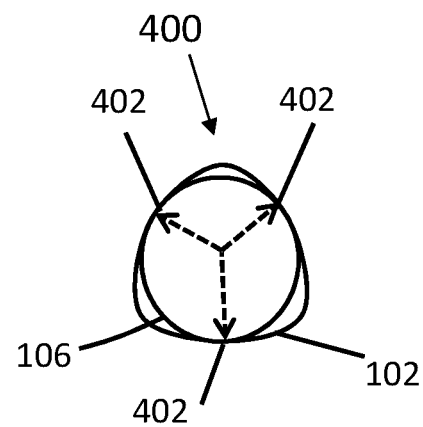
FIG. 5 is a schematic view of an interaction between an actuator output shaft and a flex spline in accordance with alternate embodiments.

With reference to FIGS. 1-5, an inverted harmonic gear actuator 100 is provided. The inverted harmonic gear actuator 100 includes an electric motor 101, a flex spline 102 and a wave generator 103. The electric motor 101 includes a motor stator 202 with windings 204 wrapped around stator winding supports 206 to couple the windings 204 to the motor stator 202. The windings 204 are receptive of electric current. The electric motor 101 also includes a motor rotor 208 disposed radially within the motor stator 202. The motor rotor 208 includes a circumferential array of magnets 210 coupled to the motor rotor 208 such that, when electric current is supplied to the windings 204, a flux moment is induced in the motor rotor 208 which causes the motor rotor 208 to rotate about axis A. This rotary motion serves to drive corresponding rotations of the wave generator 103. The wave generator 103 is radially disposed within the motor rotor 208. The motor rotor 208 can have a substantially circular shape that contacts a substantially circular radially outer surface 212 of the wave generator 103. To produce a harmonic motion, the wave generator 103 has a radially inner surface 214 with a cammed shape. The cammed shape can translate through a plurality of roller bearings 104 to the flex spline 102, which drives rotation of an actuator output shaft 106 about axis A. The flex spline 102 is radially interposable between the radially inner surface 214 of the wave generator 103 and the actuator output shaft 106, where the flex spline 102 is deformable to conform to the radially inner surface 214 of the wave generator 103 and drive rotation of the actuator output shaft 106 slower than rotation of the motor rotor 208. In embodiments, a rotational speed ratio of the motor rotor 208 to the actuator output shaft 106 can be, for example, from 80:1 to 200:1 in a basic harmonic configuration. When incorporated in a compound harmonic configuration, a rotational speed ratio of the motor rotor 208 to the actuator output shaft 106 can be, for example, from 400:1 to 10,000:1.

The flex spline 102 can be made of an elastic metal with a radially inner surface 216 including a first plurality of gear teeth 218 operable to mesh with a second plurality of gear teeth 220 of a gear interface 222 of the actuator output shaft 106. The gear interface 222 can be a substantially circular and rigid gear, and the radially inner surface 216 of the flex spline 102 can include a greater number of gear teeth 218 than a number of gear teeth 220 on the gear interface 222 of the actuator output shaft 106. The wave-like motion of the radially inner surface 214 of the wave generator 103 rotating can contour the flex spline 102 into a non-circular shape, such as an elliptical shape 300 (FIG. 4) with two gear meshing regions 302 with respect to the actuator output shaft 106 or a multi-lobed shape 400 (FIG. 5) with at least three gear meshing regions 402 with respect to the actuator output shaft 106 as two examples of alternate embodiments. The gear meshing regions 302, 402 progress in a rolling fashion between the teeth 218, 220 as the flex spline 102 rotates about axis A. The difference in shape between the flex spline 102 and actuator output shaft 106 results in a disconnect of teeth 218, 220 between the gear meshing regions 302, 402, which in combination with the reduced number of teeth 220 of the gear interface 222 results in a slowing of rotation of the actuator output shaft 106 relative to rotation of the motor rotor 208.

In embodiments, the plurality of roller bearings 104 is radially disposed between the radially inner surface 214 of the wave generator 103 and a radially outer surface 224 of the flex spline 102. A roller bearing inner race 226 can be disposed between the flex spline 102 and the roller bearings 104, and a roller bearing outer race 228 can be disposed between the wave generator 103 and the roller bearings 104. Rotation within the inverted harmonic gear actuator 100 can also be supported by a plurality of motor bearings 108, for instance, between the motor rotor 208 and motor stator 202, between the motor stator 202 and the actuator output shaft 106, and/or between the motor rotor 208 and the actuator output shaft 106.

In embodiments, the actuator output shaft 106 extends axially outward from the motor rotor 208 and includes a splined interface 110 to drive rotation of a load 112. The load 112 can be an aircraft load, where a relatively large amount of torque is required to pivot an aerodynamic surface relative to another aerodynamic surface. Alternatively, the load 112 can be a component of a propulsion system, such as an aircraft engine accessory system, a controlled feature of an engine, or other component. The actuator output shaft 106 can be limited in rotation to less than one complete rotation or can support multiple complete rotations depending upon installation and usage constraints.

Turning now to FIG. 6, a method 500 of assembling the inverted harmonic gear actuator 100 is described in reference to FIGS. 1-6. Although described in a particular order, it will be understood that the steps of the method 500 can be performed in an alternate order and can include additional steps.

At block 510, a wave generator 103 is coupled radially within a motor rotor 208, where the wave generator 103 has a radially inner surface 214 with a cammed shape. The cammed shape can be similar to the elliptical shape 300 or multi-lobed shape 400 of FIGS. 4 and 5. The coupling can be a press fit coupling. Alternatively, the term "coupled" or "coupling" can also include where the wave generator 103 is integrally formed with the motor rotor 208 as a single piece.

At block 520, a flex spline 102 is interposed radially between the radially inner surface 214 of the wave generator 103 and an actuator output shaft 106. The flex spline 102 is deformable to conform to the radially inner surface 214 of the wave generator 103 and drive rotation of the actuator output shaft 106 slower than rotation of the motor rotor 208. Roller bearings 104 can be positioned between the radially inner surface 214 of the wave generator 103 and a radially outer surface 224 of the flex spline 102. A roller bearing inner race 226 can be positioned between the flex spline 102 and the roller bearings 104. A roller bearing outer race 228 can be positioned between the wave generator 103 and the roller bearings 104.

At block 530, the motor rotor 208 is positioned radially within the motor stator 202 to arrange the windings 204 of the motor stator 202 proximate to the magnets 210 of the motor rotor 208 in the electric motor 101. Prior to positioning the motor rotor 208 within the motor stator 202, multiple motor bearings 108 can be installed between two or more components of the electric motor 101. A splined interface 110 of the actuator output shaft 106 can engage a load 112 to be driven to rotate responsive to applying an electric current to the windings 204 of the motor stator 202.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inverted harmonic gear actuator, comprising:
    a motor stator;
    a motor rotor radially disposed within the motor stator;
    a wave generator radially disposed within the motor rotor, the wave generator comprising a radially inner surface with a cammed shape comprising a multi-lobed shape;
    an actuator output shaft radially disposed within the wave generator;
    a flex spline radially interposable between the radially inner surface of the wave generator and the actuator output shaft, the flex spline deformable to conform to the radially inner surface of the wave generator and drive the rotation of the actuator output shaft slower than rotation of the motor rotor, wherein a radially inner surface of the flex spline comprises a first plurality of gear teeth configured to mesh with a second plurality of gear teeth of a gear interface of the actuator output shaft with at least three gear meshing regions;
    a plurality of roller bearings radially disposed between the radially inner surface of the wave generator and a radially outer surface of the flex spline;
    a first motor bearing axially positioned between the roller bearings and a splined interface of the actuator output shaft, the first motor bearing supporting rotation of the actuator output shaft;
    a second motor bearing radially disposed between the radially inner surface of the wave generator and a radially outer surface of the actuator output shaft, wherein the second motor bearing is axially offset from the first motor bearing and the roller bearings with respect to an axis of rotation of the actuator output shaft; and
    a third motor bearing radially disposed between a radially outer surface of the wave generator and a housing of the inverted harmonic gear actuator.

2. The inverted harmonic gear actuator according to claim 1, wherein the radially inner surface of the flex spline comprises a greater number of gear teeth than a number of gear teeth on the gear interface of the actuator output shaft.

3. The inverted harmonic gear actuator according to claim 2, wherein the actuator output shaft extends axially outward from the motor rotor and comprises the splined interface to drive rotation of a load.

4. The inverted harmonic gear actuator according to claim 2, wherein the motor rotor and the gear interface of the actuator output shaft are substantially circular.

5. The inverted harmonic gear actuator according to claim 1, further comprising:
    a roller bearing inner race disposed between the flex spline and the roller bearings; and
    a roller bearing outer race disposed between the wave generator and the roller bearings.

6. The inverted harmonic gear actuator according to claim 1, further comprising:
    a plurality of windings coupled to the motor stator; and
    a plurality of magnets coupled to the motor rotor.

7. The inverted harmonic gear actuator according to claim 1, wherein the wave generator and the motor rotor are integrated in a single piece.

8. A method of assembling an inverted harmonic gear actuator, the method comprising:
    coupling a wave generator radially within a motor rotor, the wave generator comprising a radially inner surface with a cammed shape comprising a multi-lobed shape;
    interposing a flex spline radially between the radially inner surface of the wave generator and an actuator output shaft, the flex spline deformable to conform to the radially inner surface of the wave generator and drive rotation of the actuator output shaft slower than rotation of the motor rotor, wherein a radially inner surface of the flex spline comprises a first plurality of gear teeth configured to mesh with a second plurality of gear teeth of a gear interface of the actuator output shaft with at least three gear meshing regions;
    positioning a plurality of roller bearings between the radially inner surface of the wave generator and a radially outer surface of the flex spline;
    positioning a first motor bearing axially between the roller bearings and a splined interface of the actuator output shaft, the first motor bearing supporting rotation of the actuator output shaft;
    positioning a second motor bearing radially between the radially inner surface of the wave generator and a radially outer surface of the actuator output shaft, wherein the second motor bearing is axially offset from the first motor bearing and the roller bearings with respect to an axis of rotation of the actuator output shaft;

positioning a third motor bearing radially between a radially outer surface of the wave generator and a housing of the inverted harmonic gear actuator; and positioning the motor rotor radially within a motor stator.

9. The method according to claim 8, wherein the radially inner surface of the flex spline comprises a greater number of gear teeth than a number of gear teeth on the gear interface of the actuator output shaft.

10. The method according to claim 9, wherein the actuator output shaft extends axially outward from the motor rotor and comprises the splined interface to drive rotation of a load.

11. The method according to claim 9, wherein the motor rotor and the gear interface of the actuator output shaft are substantially circular.

12. The method according to claim 8, further comprising:
positioning a roller bearing inner race between the flex spline and the roller bearings; and
positioning a roller bearing outer race between the wave generator and the roller bearings.

13. The method according to claim 8, further comprising:
coupling a plurality of windings to the motor stator; and
coupling a plurality of magnets to the motor rotor.

14. The method according to claim 8, wherein coupling the wave generator radially within the motor rotor comprises integrally forming the wave generator and the motor rotor as a single piece.

* * * * *